UNITED STATES PATENT OFFICE.

GEORG MERLING AND HUGO KÖHLER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

KETONE ALCOHOLS.

989,993. Specification of Letters Patent. Patented Apr. 18, 1911.

No Drawing. Application filed December 17, 1909. Serial No. 533,699. (Specimens.)

*To all whom it may concern:*

Be it known that we, GEORG MERLING, professor of chemistry, doctor of philosophy, and HUGO KÖHLER, doctor of philosophy, chemist, citizens of the German Empire, residing at Elberfeld, Germany, have invented new and useful Improvements in Ketone Alcohols, of which the following is a specification.

Our invention relates to the manufacture and production of new valuable products being ketone alcohols which products are obtained by treating acetone or its homologues, such as ethyl-methyl-ketone with formaldehyde or compounds capable of generating formaldehyde in the presence of alkaline condensing agents exercising a mild action on the components to be condensed. Such condensing agents are *e. g.* sodium or potassium carbonate, magnesium carbonate or oxid, bisodium phosphate, borax, etc.

The new compounds are limpid oils soluble in ether, alcohol and benzene and possess the general formula:

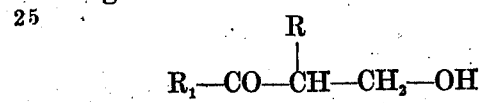

in which $R_1$ means an alkyl group and R the group $C_nH_{2n+1}$ which group includes hydrogen itself. On being boiled with acetic acid anhydrid they are converted into the acetyl compounds.

In order to illustrate the new process more fully the following example is given, the parts being by weight. A mixture of three parts of acetone with one part of a 35 per cent. formaldehyde is shaken together for some hours with a concentrated aqueous solution of 0.02 to 0.06 parts of potassium carbonate until in a test portion diluted with water formaldehyde can no longer be detected. To carry out this test, some drops of an aqueous solution of acetate of anilin are added to the diluted liquid which is then allowed to stand for 15 minutes. If after this time no precipitation or clouding due to the formation of methylene anilin is observed, the liquid is free from formaldehyde. The temperature of the liquid slowly rises to 30–35° C. and it is kept at this point by cooling. The liquid is then placed into a separatory funnel and the lower layer containing the potash solution is removed. The thus obtained liquid is carefully neutralized with dilute hydrochloric or sulfuric acid, the potassium chlorid or sulfate is filtered off and the filtrate is distilled *in vacuo*, the vessel being heated on a water bath. Acetone and water pass over, while the new ketobutanol:

remains as a thick oil. The crude product boils at from 95 to 120° at 30 mm. pressure and upon completion of the distillation a higher boiling dark colored oil remains which on cooling changes into a tenacious syrup. After a second distillation the ketobutanol boils at 109–110° C. at 30 mm. pressure. It is a limpid colorless oil soluble in water, alcohol and ether. On being kept for some time it changes into a tenacious syrup insoluble in water. On being boiled with acetic acid anhydrid it is converted into the acetyl compound

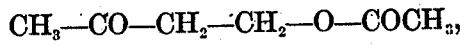

a limpid, stable oil boiling at 96° at 15 mm. pressure which does not change on being kept. The formation of the product probably takes place according to the following formula:

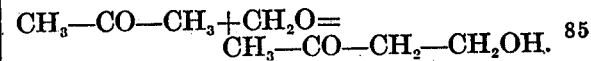

The new methylketobutanol obtained in an analogous manner from ethylmethylketone and formaldehyde is a colorless oil boiling at 90–95° C. at 15 mm. pressure having probably the formula:

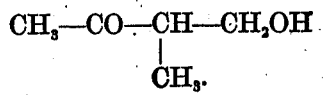

Other ketones may be used.

The compounds thus obtained are valuable intermediate products for the production of pharmaceutical products or other valuable bodies.

We claim:—

1. The herein described ketone alcohols, obtainable by reacting upon ketones with formaldehyde having the general formula:

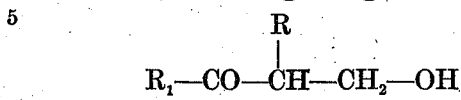

$$R_1\text{—CO—CH(R)—CH}_2\text{—OH}$$

in which $R_1$ means an alkyl group and R the group $C_nH_{2n+1}$, which products are limpid oils soluble in ether alcohol and benzene and convertible into acetates on being boiled with acetic acid anhydrid, substantially as described.

2. The herein described ketobutanol, obtainable by reacting upon acetone with formaldehyde, which is a limpid colorless oil boiling at 109–110° C. at 30 mm. pressure soluble in water, alcohol, ether and benzol, being converted into the acetyl compound on being boiled with acetic acid anhydrid, which acetyl compound is a limpid oil boiling at 96° C. at 15 mm. pressure, substantially as described.

In testimony whereof we have hereunto set our hands in the presence of two subscribing witnesses.

GEORG MERLING. [L. S.]
HUGO KÖHLER. [L. S.]

Witnesses:
OTTO KÖNIG,
CHAS. J. WRIGHT.